United States Patent
Xu et al.

(10) Patent No.: US 12,275,286 B2
(45) Date of Patent: Apr. 15, 2025

(54) MULTI-LINK INDEPENDENT SUSPENSION FOR VEHICLE, AND VEHICLE

(71) Applicant: NIO TECHNOLOGY (ANHUI) CO., LTD, Hefei (CN)

(72) Inventors: Zhe Xu, Shanghai (CN); Haibo Wang, Shanghai (CN); Dongdong Wang, Shanghai (CN); Biao Chen, Shanghai (CN); Jun Dai, Shanghai (CN); Xu Han, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 52 days.

(21) Appl. No.: 18/059,487

(22) Filed: Nov. 29, 2022

(65) Prior Publication Data

US 2023/0173860 A1    Jun. 8, 2023

(30) Foreign Application Priority Data

Dec. 3, 2021   (CN) .......................... 202111467523.3

(51) Int. Cl.
*B60G 3/28*    (2006.01)
*B60G 7/00*    (2006.01)
*B62D 17/00*   (2006.01)

(52) U.S. Cl.
CPC ............... *B60G 3/28* (2013.01); *B60G 7/008* (2013.01); *B62D 17/00* (2013.01);
(Continued)

(58) Field of Classification Search
CPC .... B60G 3/28; B60G 7/008; B60G 2200/184; B60G 2200/46; B60G 2204/148; B62D 17/00

See application file for complete search history.

(56) References Cited

U.S. PATENT DOCUMENTS 7,703,565 B2 *  4/2010  Ikenoya ............... B60K 17/356
                                                   180/65.6
10,118,452 B2 * 11/2018  Drotar .................... B60G 7/008
(Continued)

FOREIGN PATENT DOCUMENTS

DE    102013002712 A1 *  8/2014  ............... B60G 3/20

OTHER PUBLICATIONS

DE-102013002712-A1 Machine English Translation (Year: 2014).*

*Primary Examiner* — Jason D Shanske
*Assistant Examiner* — Matthew James O'Neill
(74) *Attorney, Agent, or Firm* — Sheridan Ross P.C.

(57) ABSTRACT

The disclosure relates to the technical field of vehicles, and particularly provides a multi-link independent suspension for a vehicle that includes a subframe and a steering knuckle. In order to solve the problem of reduced adjustment efficiency caused by mutual restraining of linkages of an existing multi-link independent suspension when a camber angle is adjusted, the multi-link independent suspension includes a spring control arm that is configured to adjust a camber angle of a wheel center. The multi-link independent suspension also includes a front upper control arm and a rear upper control arm. A central axis of the front upper control arm intersects with a central axis of the rear upper control arm at a Q point, and the Q point has the same coordinate as the wheel center in an X direction; and a motion centerline between the front upper control arm and the rear upper control arm coincides with a projection of a central axis of the spring control arm on an XY plane, so that a movement of the spring control arm has no effect on an upper control arm system when the camber angle is being adjusted. The steering knuckle only rotates about an X axis so as to drive a tire to rotate about the X axis, so that a camber angle of the tire can be adjusted without changing a toe-in angle, thereby (Continued)

reducing the number of affected linkages and simplifying the adjustment in the camber angle of the tire.

10 Claims, 5 Drawing Sheets

(52) U.S. Cl.
CPC .... *B60G 2200/184* (2013.01); *B60G 2200/46* (2013.01); *B60G 2204/148* (2013.01)

(56) References Cited

U.S. PATENT DOCUMENTS

2017/0305221 A1* 10/2017 Schmidt ................ B60G 7/005
2019/0283804 A1*  9/2019 Ojima .................. B62D 5/0457

* cited by examiner

MULTI-LINK INDEPENDENT SUSPENSION FOR VEHICLE, AND VEHICLE

CROSS-REFERENCE TO RELATED APPLICATIONS

This application claims the benefit of China Patent Application No. 202111467523.3 filed Dec. 3, 2021, the entire contents of which are incorporated herein by reference in its entirety.

TECHNICAL FIELD

The disclosure relates to the technical field of vehicles, and particularly provides a multi-link independent suspension for a vehicle and a vehicle that includes the multi-link independent suspension.

BACKGROUND

With the rapid development of vehicle technologies, users have higher and higher requirements for comfort and handling performance of vehicles. A suspension, as a core component of a vehicle chassis, directly determines the handling performance and riding comfort of a vehicle. Therefore, the research and development of suspensions are crucial to major vehicle manufacturers. Vehicle suspensions are classified into independent suspensions and dependent suspensions. As one kind of independent suspension, a multi-link independent suspension has a plurality of links that are respectively connected to a subframe and a steering knuckle, and each link may control forces acting on a wheel in multiple directions. Therefore, the vehicles equipped with the multi-link independent suspensions generally have excellent handling performance and riding comfort.

Although the multi-link suspension has the above-mentioned advantages, the adjustment of camber angles and toe-in angles is complicated due to the complexity of linkages and the mutual restraint of stress directions of the linkages. When the camber angles are adjusted by adjusting spring control arms during four-wheel alignment, the toe-in angles will also be affected, and thus affects the efficiency of four-wheel alignment, adversely affecting the four-wheel alignment adjustment and the durability of the suspension.

Accordingly, there is a need in the art for a novel multi-link independent suspension for a vehicle to solve the problem of reduced adjustment efficiency caused by mutual restraining of linkages of an existing multi-link independent suspension when a camber angle is adjusted.

BRIEF SUMMARY

The disclosure aims to solve the above-mentioned technical problem, namely, to solve the problem of reduced adjustment efficiency caused by mutual restraining of linkages of an existing multi-link independent suspension when a camber angle is adjusted.

In a first aspect, the disclosure provides a multi-link independent suspension for a vehicle that includes a subframe and a steering knuckle, the multi-link independent suspension comprising a front upper control arm, a rear upper control arm and a spring control arm, wherein:
  a first end of each of the front upper control arm, the rear upper control arm and the spring control arm is pivotally connected to the subframe, and a second end of each of the front upper control arm, the rear upper control arm and the spring control arm is pivotally connected to the steering knuckle;
  the second end of the spring control arm is arranged below the steering knuckle, and the second end of the front upper control arm and the second end of the rear upper control arm are respectively arranged above the steering knuckle;
  the spring control arm is configured to move the steering knuckle so as to adjust a camber angle of a wheel center;
  a central axis of the front upper control arm intersects with a central axis of the rear upper control arm at a Q point, and the Q point has a coordinate that is the same as a coordinate of the wheel center in an X direction of the vehicle;
  a rotation axis of the first end of the front upper control arm intersects with a rotation axis of the first end of the rear upper control arm at a P point;
  a connecting line between the P point and the Q point is defined as a motion centerline PQ between the front upper control arm and the rear upper control arm; and
  the motion centerline PQ coincides with a projection of a central axis of the spring control arm on an XY plane of the vehicle.

In a preferred technical solution of the multi-link independent suspension for a vehicle, the multi-link independent suspension further comprises a front lower control arm and a toe-in adjustment arm, wherein a first end of each of the front lower control arm and the toe-in adjustment arm is pivotally connected to the subframe, and a second end of each of the front lower control arm and the toe-in adjustment arm is pivotally connected to the steering knuckle; the second end of the front lower control arm is arranged below the steering knuckle and located in front of the spring control arm; and the toe-in adjustment arm is configured to move the steering knuckle so as to adjust a toe-in angle of the wheel center.

In a preferred technical solution of the multi-link independent suspension for a vehicle, a rotation axis of the first end of the spring control arm intersects with a rotation axis of the first end of the front lower control arm at an M point, and the central axis of the spring control arm intersects with a central axis of the front lower control arm at an N point;
  a connecting line between the M point and the N point is defined as a motion centerline MN of a control arm combination that includes the front upper control arm, the front lower control arm, the rear upper control arm and the spring control arm; and
  the motion centerline MN of the control arm combination that includes the front upper control arm, the front lower control arm, the rear upper control arm and the spring control arm is parallel to a central axis of the toe-in adjustment arm, and a rotation center of the second end of the toe-in adjustment arm has a coordinate that is the same as a coordinate of the wheel center in a Z direction of the vehicle.

In a preferred technical solution of the multi-link independent suspension for a vehicle, an angle a between the rotation axis of the first end of the front upper control arm and the rotation axis of the first end of the rear upper control arm is approximately between 30° and 45°, an angle b between the rotation axis of the first end of the spring control arm and the rotation axis of the first end of the front lower control arm is approximately between 45° and 60°, and the sum of the angle a and angle b is approximately 90°±10°.

In a preferred technical solution of the multi-link independent suspension for a vehicle, the multi-link independent suspension further comprises a stabilization rod which is fixed to the subframe and which is rotatable about a first axis, an end portion of the stabilization rod being pivotally connected to the steering knuckle.

In a preferred technical solution of the multi-link independent suspension for a vehicle, the stabilization rod comprises a rear stabilization rod having two ends and one or more stabilization rod links, wherein the rear stabilization rod is fixed to a rear side of the subframe and the rear stabilization rod is rotatable about the first axis, each of the two ends of the rear stabilization rod is respectively located on either side of the subframe and is pivotally connected to one of the one or more stabilization rod links at one end of the connected stabilization rod link, an opposite end of the connected stabilization rod link is pivotally connected to the steering knuckle, and connecting points of the second ends of the front upper control arm, the front lower control arm, the rear upper control arm, the spring control arm and the toe-in adjustment arm to the steering knuckle are all located on an inner side of a connecting point between the stabilization rod link and the steering knuckle, such that a distance from the wheel center to each of the connecting points of the second ends of the front upper control arm, the front lower control arm, the rear upper control arm, the spring control arm and the toe-in adjustment arm to the steering knuckle is greater than the distance from the wheel center to the connecting point of the stabilization rod link to the steering knuckle.

In a preferred technical solution of the multi-link independent suspension for a vehicle, a plane defined by the central axis of the front upper control arm and the central axis of the rear upper control arm is parallel to the XY plane.

In a preferred technical solution of the multi-link independent suspension for a vehicle, the second end of the front lower control arm and the second end of the spring control arm are respectively located in front of and behind a drive shaft.

In a preferred technical solution of the multi-link independent suspension for a vehicle, an eccentric bolt is coupled between the spring control arm and the subframe.

The disclosure further provides a vehicle comprising the multi-link independent suspension for a vehicle in any one of the above technical solutions.

Those skilled in the art will appreciate that according to the multi-link independent suspension for a vehicle of the disclosure, the vehicle comprising a subframe and a steering knuckle, the multi-link independent suspension comprising a front upper control arm, a rear upper control arm and a spring control arm, wherein the front upper control arm, the rear upper control arm and the spring control arm have first ends respectively pivotally connected to the subframe, and second ends respectively pivotally connected to the steering knuckle; the second end of the spring control arm is arranged below the steering knuckle, and the second end of the front upper control arm and the second end of the rear upper control arm are respectively arranged above the steering knuckle; the spring control arm is configured to moveably push and pull the steering knuckle so as to adjust a camber angle of a wheel center; a central axis of the front upper control arm intersects with a central axis of the rear upper control arm at a Q point, and the Q point has the same coordinate as the wheel center in an X direction of the vehicle; a rotation axis of the first end of the front upper control arm intersects with the rotation axis of the first end of the rear upper control arm at a P point; a connecting line between the P point and the Q point is defined as a motion centerline PQ between the front upper control arm and the rear upper control arm; and the motion centerline PQ coincides with a projection of a central axis of the spring control arm on an XY plane of the vehicle.

With the above-mentioned technical solutions, the multi-link independent suspension of the disclosure control the forces acting on the steering knuckle by pivotally connecting the two ends of each of the front upper control arm, the rear upper control arm and the spring control arm to the subframe and the steering knuckle respectively, so that when the tire vibrates up and down, the suspension moves up and down in a Z-axis direction, thereby alleviating the vibration of a frame. When the camber angle is being adjusted, the spring control aim moves back and forth in the direction along the central axis of the spring control arm so that the spring control arm travels toward or away from the subframe to push or pull the steering knuckle, thereby driving the steering knuckle to rotate, and the steering knuckle drives the tire to rotate, thereby adjusting the camber angle of the wheel center. Further, a central axis of the front upper control arm intersects with a central axis of the rear upper control arm at a Q point, and the Q point has the same coordinate as the wheel center in an X direction. In this way, when the spring control arm moves, the adjustment can directly act on the wheel center, thereby making the amount of adjustment more accurate. Still further, a rotation axis of the first end of the front upper control arm intersects with the rotation axis of the first end of the rear upper control arm at a P point; a connecting line between the P point and the Q point is defined as a motion centerline PQ between the front upper control arm and the rear upper control arm; and the motion centerline PQ between the front upper control arm and the rear upper control arm coincides with the projection of the central axis of the spring control arm on the XY plane of the vehicle, so that when the spring control arm moves, the front upper control arm and the rear upper control arm remain stationary. In this way, the movement of the spring control arm during the adjustment of the camber angle has no effect on the front upper control arm and the rear upper control arm of an upper control arm system. The steering knuckle may rotate only about the X axis and thus drives the tire to rotate about the X axis, so that the camber angle of the tire can be adjusted without causing the toe-in angle to change. Compared with the fact in the prior art that adjusting a camber angle also causes a toe-in angle to change during the movement of the spring control arm, the disclosure allows the steering knuckle to only rotate about the X axis to adjust the camber angle and avoids a change in the toe-in angle by preventing the steering knuckle from rotating about the Z axis. As such, the disclosure reduces the mutual restraining of linkages of a multi-link independent suspension and simplify the adjustment of the camber angle of the tire.

The adjustment of the camber angle within one plane (i.e., the XY plane) allows the adjustment of the camber angle to be independent of the toe-in angle, thereby avoiding the problem in the prior art of difficulty in four-wheel alignment caused by mutual restraining of linkages when the spring control arm moves and the steering knuckle rotates in a three-dimensional space. This independent adjustment of the camber angle makes the four-wheel alignment of the suspension more efficient and accurate, improves the adjustment efficiency, and improves the durability of the suspension.

BRIEF DESCRIPTION OF THE SEVERAL VIEWS OF THE DRAWINGS

Preferred embodiments of the invention are described below with reference to the accompanying drawings.

LIST OF REFERENCE SIGNS

Figure 1:
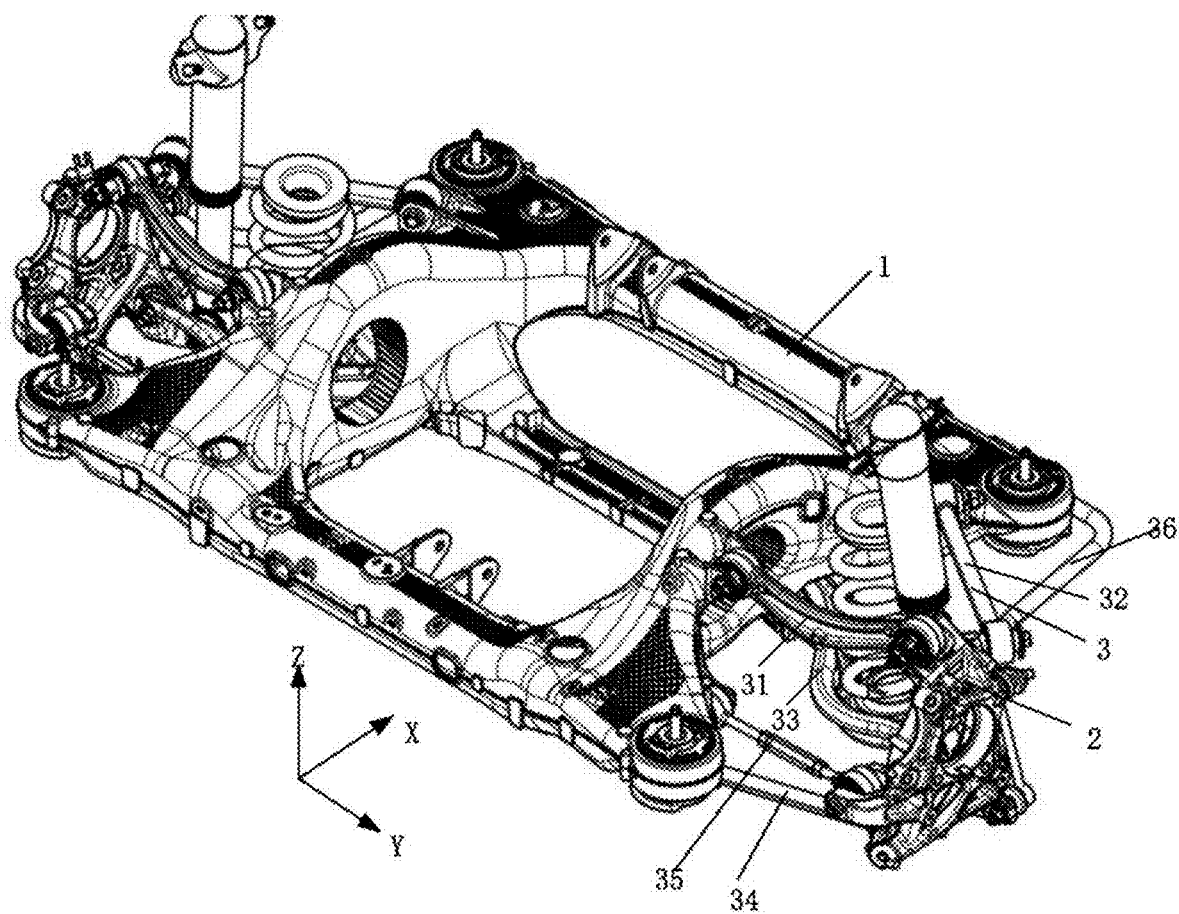
FIG. 1 is a schematic view illustrating an assembled structure of a five-link independent suspension according to the disclosure.

1. Subframe; 2. Steering knuckle; 3. Five-link independent suspension; 31. Front upper control arm; 32. Rear upper control arm; 33. Spring control arm; 331. Eccentric bolt; 34. Front lower control arm; 35. Toe-in adjustment arm; 351. Toe-in adjustment arm body; 352. Toe-in threaded sleeve; 36. Stabilization rod; 361. Rear stabilization rod; 362. Stabilization rod link; 363. First axis.

DETAILED DESCRIPTION

Preferred embodiments of the disclosure are described below with reference to the accompanying drawings. Those skilled in the art should understand that these implementations are only used to explain the technical principles of the disclosure, and are not intended to limit the scope of protection of the disclosure. Those skilled in the art can make adjustments according to requirements so as to adapt to specific application scenarios.

It should be noted that in the description of the disclosure, the terms, such as "center", "upper", "lower", "left", "right", "vertical", "horizontal", "inner" and "outer", that indicate directions or positional relationships are based on the directions or positional relationships shown in the drawings only for convenience of description, and do not indicate or imply that the device or element must have a specific orientation, be constructed and operated in a specific orientation, and therefore cannot be understood as limitation to the disclosure.

In addition, it should also be noted that, in the description of the disclosure, the terms "mount", "engage" and "connect" should be interpreted in a broad sense unless explicitly defined and limited otherwise, which, for example, may mean a fixed connection, a detachable connection or an integral connection; may mean a mechanical connection; or may mean a direct connection, an indirect connection by means of an intermediary, or internal communication between two elements. For those skilled in the art, the specific meaning of the above-mentioned terms in the disclosure can be interpreted according to the specific situation.

Figure 2:
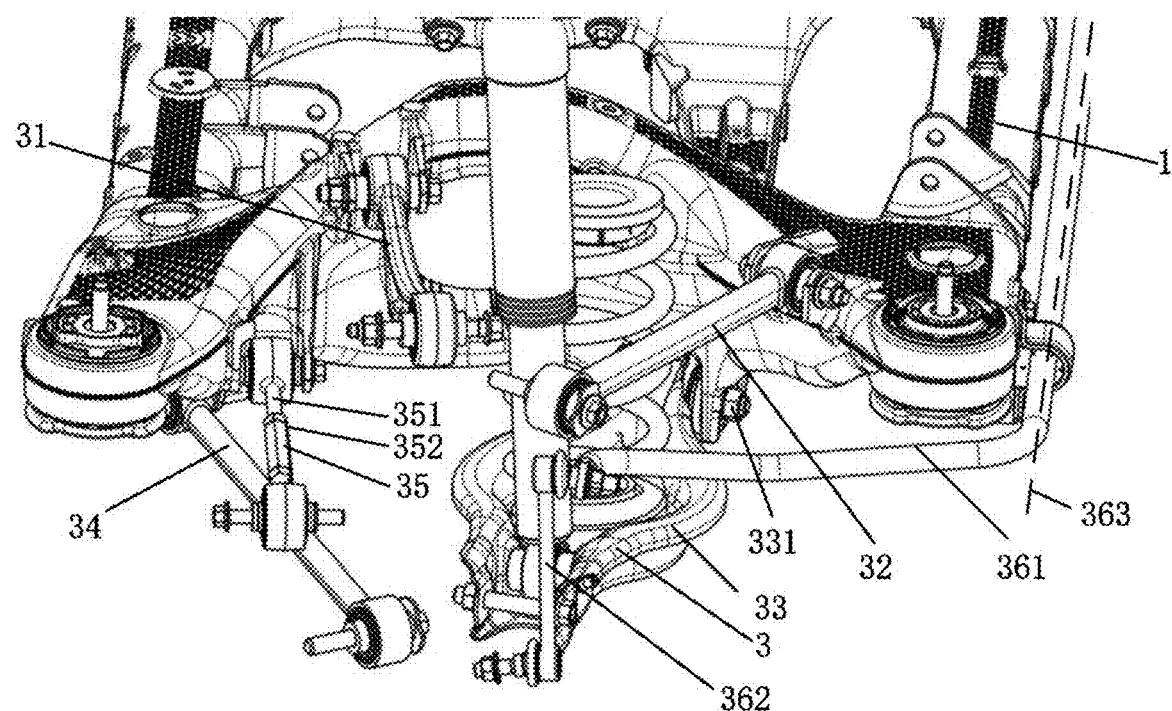
FIG. 2 is a schematic front view illustrating a structure of the five-link independent suspension of the disclosure.
Figure 3:
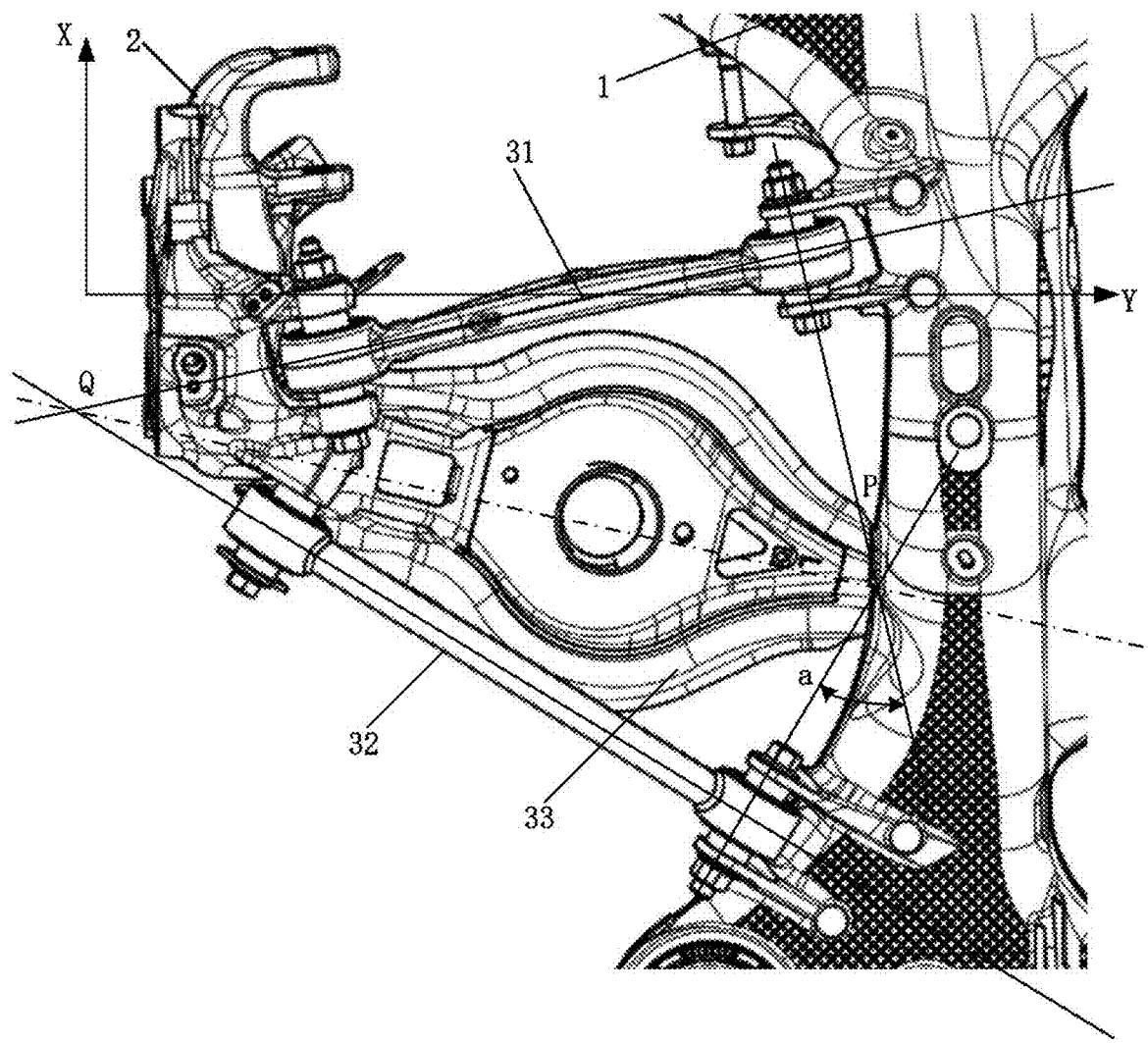
FIG. 3 is a schematic top view illustrating a structure of an upper control arm system and a spring control arm of the five-link independent suspension of the disclosure.
Figure 4:
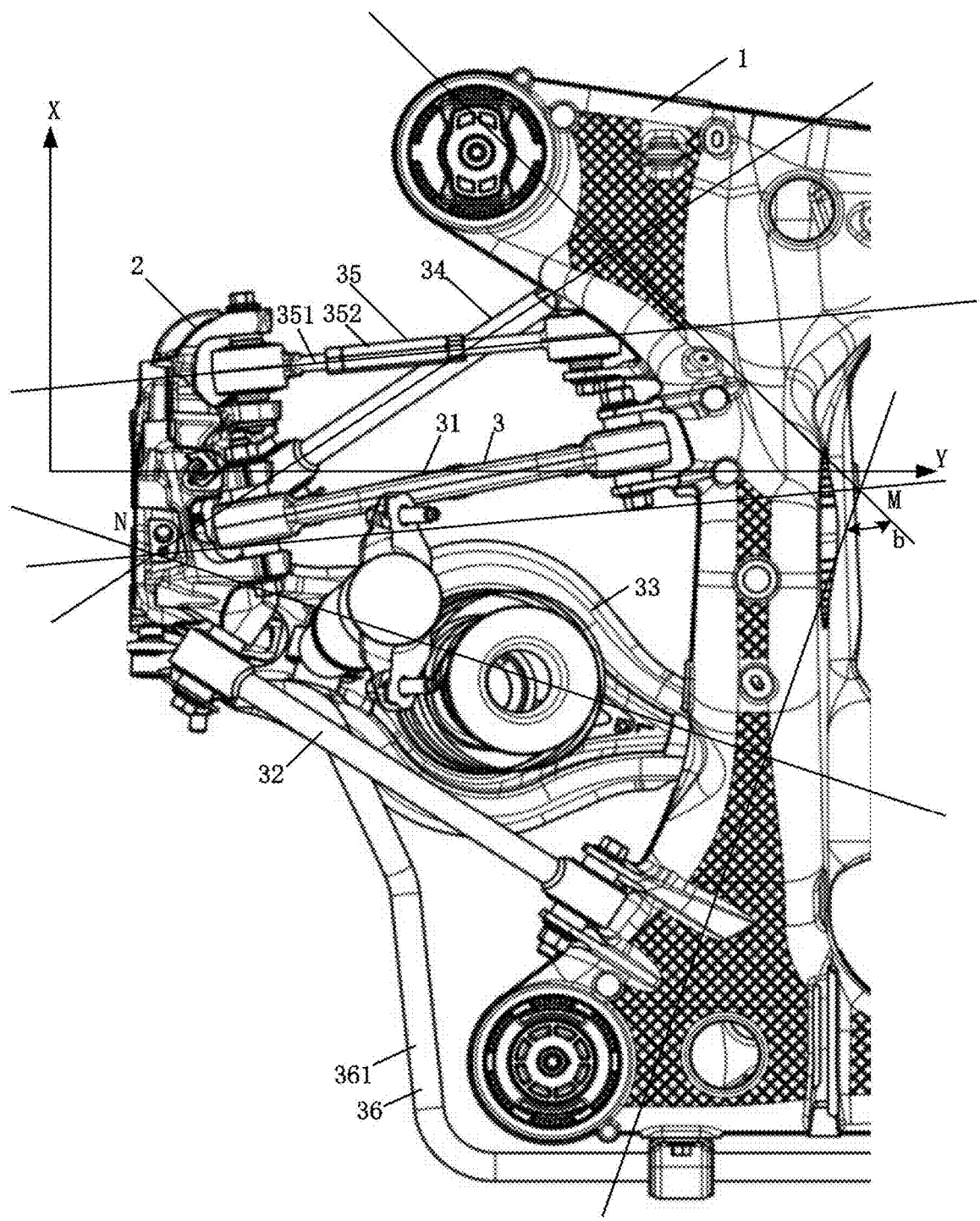
FIG. 4 is a schematic top view illustrating a structure of the five-link independent suspension of the disclosure.

As shown in FIG. 1 to FIG. 4, an example five-link independent suspension 3 for a vehicle is provided in order to solve the problem of reduced adjustment efficiency caused by mutual restraining of linkages of an existing multi-link independent suspension when a camber angle is adjusted. The vehicle comprises a subframe 1 and a steering knuckle 2. The five-link independent suspension 3 comprises a front upper control arm 31, a rear upper control arm 32, a spring control arm 33, a front lower control arm 34 and a toe-in adjustment arm 35. A first end of each of the front upper control arm 31, the rear upper control arm 32, the spring control arm 33, the front lower control arm 34 and the toe-in adjustment arm 35 is respectively pivotally connected to the subframe 1, and a second end of each of the front upper control arm 31, the rear upper control arm 32, the spring control arm 33, the front lower control arm 34 and the toe-in adjustment arm 35 is respectively pivotally connected to the steering knuckle 2. The spring control arm 33 is arranged below the back of the steering knuckle 2, the front lower control arm 34 is arranged below the front of the steering knuckle 2, and the front upper control arm 31 and the rear upper control arm 32 are respectively arranged above the front and the back of the steering knuckle 2. The front upper control arm 31 and the rear upper control arm 32 are respectively located in front and back of the spring control arm 33 (the front and back referring to the head and the tail of a vehicle body, respectively), and the spring control arm 33 is configured to push and pull the steering knuckle 2 by moving back and forth along the central axis of the spring control arm 33. Preferably, by providing an eccentric bolt 331 coupled between the spring control arm 33 and the subframe 1, the spring control arm 33 can move back and forth by adjusting the eccentric bolt 331 so as to adjust a camber angle of a wheel center. A central axis of the front upper control arm 31 intersects with a central axis of the rear upper control arm 32 at a Q point. The Q point has the same coordinate as the wheel center in an X direction of the vehicle. The rotation axis of the first end of the front upper control arm 31 intersects with the rotation axis of the first end of the rear upper control arm 32 at a P point and an angle a between the rotation axis of the first end of the front upper control arm 31 and the rotation axis of the first end of the rear upper control arm 32 is approximately between 30° and 45°. The central axis of the front upper control arm 31 is a connecting line between the rotation center of the first end and the rotation center of the second end of the front upper control arm 31, and this is also applicable to the central axes of other linkages. The connecting line between the P point and the Q point is defined as a motion centerline PQ between the front upper control arm and the rear upper control arm. The motion centerline PQ between the front upper control arm 31 and the rear upper control arm 32 coincides with a projection of the central axis of the spring control arm 33 on an XY plane of the vehicle (as shown in FIG. 3, the central axis of the spring control arm 33 is a dotted line that exactly coincides with the connecting line between the P and the Q). The X coordinate axis is a coordinate axis in the direction of the length of the vehicle, the Y coordinate axis is a coordinate axis in the direction of the width of the vehicle, and the XY plane is formed by the X coordinate axis and the Y coordinate axis. That is, the motion centerline PQ between the front upper control arm 31 and the rear upper control arm 32 is a motion centerline of an upper control arm system that includes the front upper control arm 31 and the rear upper control arm 32.

The toe-in adjustment arm 35 is configured to move back and forth to push and pull the steering knuckle 2. Preferably, the toe-in adjustment arm 35 comprises a toe-in adjustment arm body 351 and a toe-in threaded sleeve 352. The toe-in threaded sleeve 352 is in a threaded connection with the toe-in adjustment arm body 351, and two ends of the toe-in adjustment arm body 351 are respectively pivotally connected to the subframe 1 and the steering knuckle 2. The overall length of the toe-in adjustment arm 35 is adjusted by rotating the toe-in threaded sleeve 352, the steering knuckle 2 is then pushed and pulled due to a displacement change caused by a change in length, thereby adjusting a toe-in angle of the wheel center. The rotation center of the second end of the toe-in adjustment arm 35 has the same coordinate as the wheel center in a Z direction of the vehicle, and the Z coordinate axis is a coordinate axis in the direction of the height of the vehicle body. A motion centerline MN of a control arm system that includes the front upper control arm 31, the front lower control arm 34, the rear upper control arm 32 and the spring control arm 33 is parallel to the central axis of the toe-in adjustment arm 35. Specifically, the rotation axis of the first end of the spring control arm 33 intersects with the rotation axis of the first end of the front lower control arm 34 at an M point and an angle b between the rotation axis of the first end of the spring control arm 33 and the rotation axis of the first end of the front lower control arm 34 is approximately between 45° and 60°. The central axis of the spring control arm 33 intersects with the central axis of the front lower control arm 34 at an N point, and the sum of the angle a and angle b is approximately 90°±10°. The motion centerline of the control arm system that includes the front upper control arm 31, the front lower control arm 34, the rear upper control arm 32 and the spring control arm 33 is motion centerline MN.

The multi-link independent suspension as described herein has the following advantages: by pivotally connecting a first end of each of the front upper control arm 31, the rear upper control arm 32, the spring control arm 33, the front lower control arm 34 and the toe-in adjustment arm 35 of the five-link independent suspension 3 to the subframe 1 and a second end of each of the front upper control arm 31, the rear upper control arm 32, the spring control arm 33, the front lower control arm 34 and the toe-in adjustment arm 35 of the five-link independent suspension 3 to the steering knuckle 2 respectively, the five control arms control the forces acting on the steering knuckle 2 in five directions, so that when a tire vibrates up and down, the suspension moves up and down in the Z-axis direction, thereby reducing the vibration of the vehicle body and improving the comfort of the vehicle. By adjusting the eccentric bolt 331, the spring control arm 33 moves back and forth in the direction along the central axis of the spring control arm 33 so that the spring control arm travels toward or away from the subframe 1, thereby driving the steering knuckle 2 to rotate, and the steering knuckle 2 drives the tire to rotate, thereby adjusting the camber angle. Further, the central axis of the front upper control arm 31 intersects with the central axis of the rear upper control arm 32 at a Q point, and the Q point has the same coordinate as the wheel center in the X direction. In this way, when the spring control arm 33 moves, the adjustment can directly act on the wheel center, thereby making the amount of adjustment more accurate. Still further, the motion centerline PQ between the front upper control arm 31 and the rear upper control arm 32 coincides with the projection of the central axis of the spring control arm 33 on the XY plane, so that when the spring control arm 33 moves, the front upper control arm 31 and the rear upper control arm 32 remain stationary. The spring control arm 33 moves back and forth relative to the upper control arm system. In this way, the steering knuckle 2 may rotate only about the X axis and thus drives the tire to rotate about the X axis, so that the camber angle of the tire can be adjusted without causing the toe-in angle to change. Compared with the fact in the prior art that adjusting a camber angle also causes a toe-in angle to change during the movement of the spring control arm 33, the disclosure allows the steering knuckle 2 to only rotate about the X axis to adjust the camber angle and avoids a change in the toe-in angle by preventing the steering knuckle 2 from rotating about the Z axis, so that the adjustment of the camber angle of the tire is simpler while fewer linkages are affected. The adjustment of the camber angle within one plane (i.e., the XY plane) allows the adjustment of the camber angle to be independent of the adjustment of the toe-in angle, thereby preventing the mutual restraining of linkages when the spring control arm 33 moves and the steering knuckle 2 rotates in a three-dimensional space. This independent adjustment of the camber angle allows for prompt yet accurate four-wheel alignment of the suspension, thereby improving the adjustment efficiency.

The toe-in adjustment arm 35 adjusts the toe-in angle of the wheel center by movably pushing and pulling the steering knuckle 2, and the rotation center of the second end of the toe-in adjustment arm 35 has the same coordinate as the wheel center in the Z direction of the vehicle. In this way, when adjusting the toe-in angle, an adjustment in the toe-in threaded sleeve 352 results in lengthening or shortening the toe-in adjustment arm 35, and this displacement generated in the length of the toe-in threaded sleeve 352 pushes and pulls the steering knuckle 2, thereby making the adjustment of the toe-in angle also directly act on the wheel center. Further, the motion centerline MN of a control arm combination that includes the front upper control arm 31, the front lower control arm 34, the rear upper control arm 32 and the spring control arm 33 is parallel to the central axis of the toe-in adjustment arm 35. Specifically, since the motion centerline PQ between the front upper control arm 31 and the rear upper control arm 32 coincides with the projection of the central axis of the spring control arm 33 on the XY plane, the motion centerline MN between the front lower control arm 34 and the spring control arm 33 is the motion centerline of the control arm system, so that the steering knuckle 2 only rotates about the Z axis so as to drive the tire to only rotate about the Z axis and thus adjusts the toe-in angle. Because the front upper control arm 31, the front lower control arm 34, the rear upper control arm 32 and the spring control arm 33 remain stationary, the camber angle does not change. Moreover, due to the above-mentioned arrangement, when the camber angle is being adjusted, the movement of the spring control arm 33 is not associated with the movement of the toe-in adjustment arm 35 and the movement of the front lower control arm 34, thereby avoiding affecting other linkages when the toe-in adjustment arm 35 pushes and pulls the steering knuckle 2.

By means of the plane adjustment of the camber angle and the plane adjustment of the toe-in angle, the adjustment of the camber angle and the adjustment of the toe-in angle are relatively independent from each other, thereby avoiding the problem in the prior art of difficulty in four-wheel alignment caused by mutual restraining of linkages when the spring control arm 33 or the toe-in adjustment arm 35 is adjusted and the steering knuckle 2 rotates in a three-dimensional space. This independency between the adjustment of the camber angle and the adjustment of the toe-in angle makes the four-wheel alignment of the suspension more efficient and accurate, thereby improving the adjustment efficiency and the durability of the suspension.

The suspension has the angle a is approximately between 30° and 45°, so that the front upper control arm 31, the rear upper control arm 32 and the spring control arm 33 are as close as possible, while the angle b is approximately between 45° and 60°, so that the front lower control arm 34 and the toe-in adjustment arm 35 are as far away from the above three camber linkages as possible. In this way, so that the structure of the suspension is compact and occupies less space while allowing independent adjustments of the camber angle and the toe-in angle.

Figure 5:
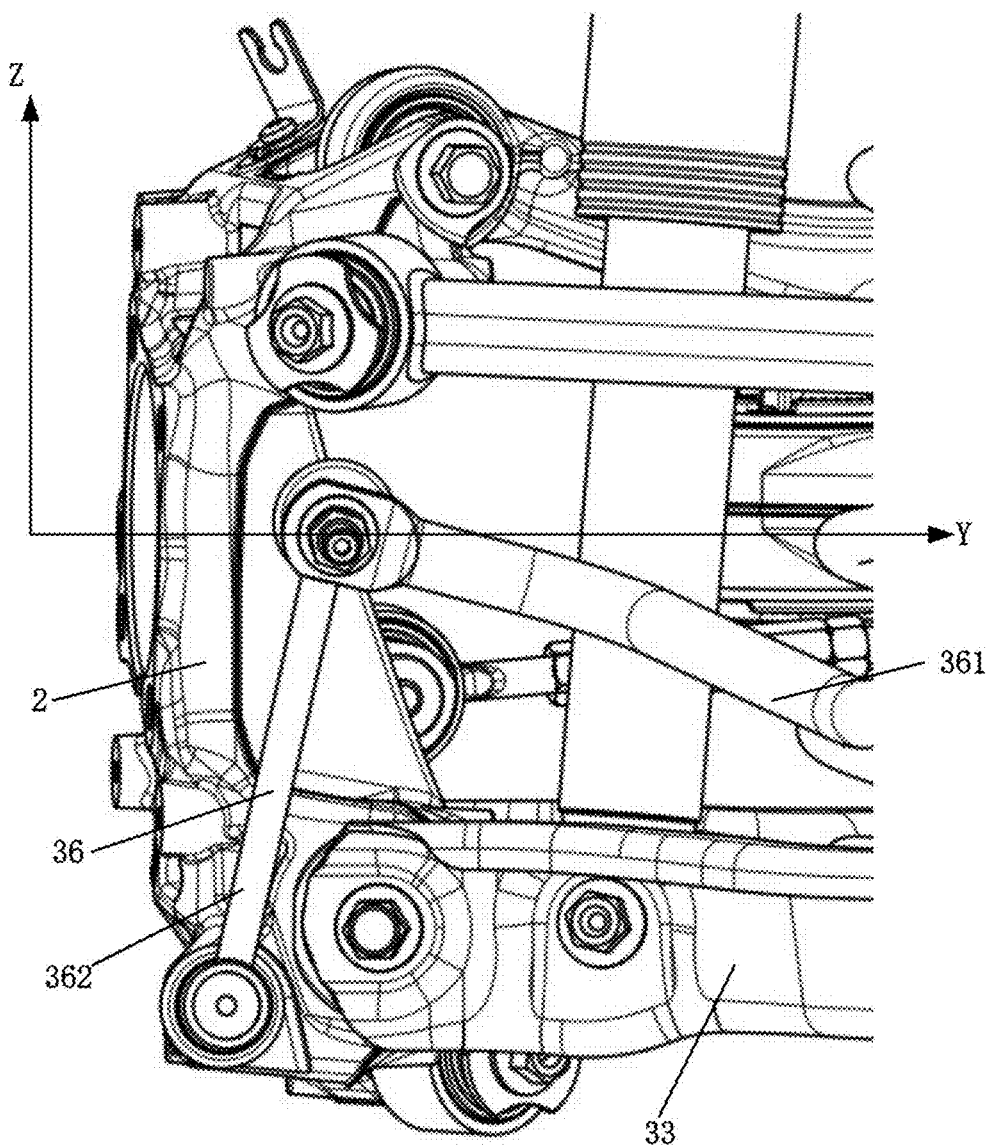
FIG. 5 is a schematic right view illustrating a structure of the five-link independent suspension of the disclosure.

As shown in FIGS. 1, 2 and 5, in one embodiment, the five-link independent suspension 3 further comprises a stabilization rod 36. The stabilization rod 36 comprises a rear stabilization rod 361 having two ends and one or more stabilization rod links 362. The rear stabilization rod 361 is fixed to the rear side of the subframe 1 (the direction from the head to the tail in the length direction of the vehicle body is the rear side), the rear stabilization rod 361 can rotate about a first axis 363, each of the two ends of the rear stabilization rod 361 is respectively located on either side (in the width direction of the vehicle body) of the subframe 1, each of the two ends of the rear stabilization rod 361 is respectively pivotally connected to one of the one or more the stabilization rod links 362 at one end of the connected stabilization rod link 362, and an opposite end of the connected stabilization rod link 362 is pivotally connected to the steering knuckle 2. Connecting points of the second ends of the front upper control arm 31, the front lower control arm 34, the rear upper control arm 32, the spring control arm 33 and the toe-in adjustment arm 35 to the steering knuckle 2 are all located on the inner side (the side that is closer to the vehicle body) of a connecting point of the connected stabilization rod link 362 to the steering knuckle 2, such that a distance from the wheel center to each of the connecting points of the second ends of the front upper control arm 31, the front lower control arm 34, the rear upper control arm 32, the spring control arm 33 and the toe-in adjustment arm 35 to the steering knuckle 2 is greater than the distance from the wheel center to the connecting point of the connected stabilization rod link 362 to the steering knuckle 2.

The multi-link independent suspension as described herein has the following advantages: the rear stabilization rod 361 is fixed to the subframe 1 and the rear stabilization rod 361 rotates about the first axis 363, and the two ends of the stabilization rod link 362 are respectively pivotally connected to the rear stabilization rod 361 and the steering knuckle 2, so that compared with the arrangement of the ends of the stabilization rod link 362 on the linkages, the influence on the linkages is avoided when the stabilization rod 36 is moved and stressed, and any additional torque generated by the stabilization rod 36 and the linkages is also avoided. Further, the connecting points of the second ends of the front upper control arm 31, the front lower control arm 34, the rear upper control arm 32, the spring control arm 33 and the toe-in adjustment arm 35 to the steering knuckle 2 are all located on the inner side of the connecting point of an end portion of the stabilization rod link 362 to the steering knuckle 2, such that the distances from the wheel center to the connecting points of the second ends of the front upper control arm 31, the front lower control arm 34, the rear upper control arm 32, the spring control arm 33 and the toe-in adjustment arm 35 to the steering knuckle 2 are all greater than the distance from the wheel center to the connecting point of the stabilization rod link 362 to the steering knuckle 2. A movement trajectory of the end of the stabilization rod link 362 connected to the steering knuckle 2 is consistent with that of the steering knuckle 2, the stabilization rod 36 prevents the tire from bouncing up when the vehicle turns, thereby preventing the vehicle from rolling over when turning. The connecting point of the connected stabilization rod link 362 to the steering knuckle 2 should be as close to the wheel center as possible and far away from the rotation center of the second end of each linkage, such that the moving distance of each linkage in the vertical direction is less than the moving distance of the stabilization rod 36 in the vertical direction, making the mechanical advantage of the stabilization rod 36 to the linkage greater than 1, and the mechanical advantage of the stabilization rod 36 corresponding to the wheel center higher. In the prior art, the stabilization rod link 362 is generally connected to one of the linkages of the suspension, in which case the kinematic characteristics and efficiency of the stabilization rod 36 are determined by this linkage, and the mechanical advantage corresponding to the wheel center is generally not higher than 0.8, while in the multi-link independent suspension as described herein, the mechanical advantage can exceed 0.95 and can be close to 1 indefinitely, increasing the stiffness of the stabilization rod 36, thereby further decreasing the diameter and weight of the stabilization rod 36 and saving the cost of the suspension.

As shown in FIG. 3, in one embodiment, a plane defined by the central axis of the front upper control arm 31 and the central axis of the rear upper control arm 32 is parallel to the XY plane, and the angle between the central axis of the spring control arm 33 and the XY plane is approximately between 0° and 10°. In some embodiments, the spring control arm 33 is parallel to the XY plane. In some other embodiments, the spring control arm 33 is inclined downward with respect to the XY plane.

The multi-link independent suspension as described herein has the following advantages: the plane defined by the central axis of the front upper control arm 31 and the central axis of the rear upper control arm 32 is parallel to the XY plane. In other words, the plane defined by the central axis of the front upper control arm 31 and the central axis of the rear upper control arm 32 is parallel to the ground, and the angle between the central axis of the spring control arm 33 and the XY plane is approximately between 0° and 10°. Such an arrangement provides a variable quantity for a wheel track. In this case, the wheel center has a variation tendency toward the outer side of the vehicle body, thereby increasing the wheel track and improving the stability of the vehicle. Thus, the angle provides sufficient variable quantity for the wheel track for improving stability of the vehicle while avoiding tire wear that can be caused by an angle that is too large resulting in a large variable quantity of the wheel track.

In summary, according to the five-link independent suspension 3 of the disclosure, each linkage forms a fixed and independent geometric relationship, and the motion combination direction corresponds to the wheel center to quantify the geometric relationship between the suspension and the wheel center and the geometric relationship between the suspension and a tire contact patch; the structural characteristics of a suspension system are further released, the motion independence of each component is also correspondingly improved, the motion characteristics of the five-link independent suspension 3 are further improved, thereby allowing adjustments for improved handling stability and comfort. The configuration and the position of the stabilization rod 36 also further improve the performance of the suspension system. During four-wheel alignment, since the adjustment range of the toe-in angle is small and the alignment is sensitive to the change in the toe-in angle, the toe-in angle is usually adjusted before adjusting the camber angle. In a practical operation, when the toe-in angle is adjusted, a camber angle adjustment system is independent of a toe-in adjustment system because of the geometry design of the suspension disclosed herein. In the practical operation, when the toe-in angle has been adjusted, the adjustment of the camber angle has no effect on the adjusted toe-in angle. Furthermore, the adjustment of the toe-in angle also has no effect on the adjustment of the camber angle.

It should be noted that the foregoing embodiments are only used to explain the principles of the disclosure, and are not intended to limit the scope of protection of the disclosure. Those skilled in the art can adjust the foregoing structures without departing from the principle of the disclosure, so that the disclosure is applicable to more specific application scenarios.

For example, in an alternative embodiment, the first end of the toe-in adjustment arm 35 is pivotally connected to the subframe 1 via a bushing, and the second end thereof is pivotally connected to the steering knuckle 2 via a ball pin. This does not depart from the principle of the disclosure, and thus would fall within the scope of protection of the disclosure.

For example, in an alternative embodiment, the first ends of the front upper control arm 31, the rear upper control arm 32, the spring control arm 33 and the front lower control arm 34 are pivotally connected to the subframe 1 respectively via bushings, and the second ends thereof are also pivotally connected to the steering knuckle 2 respectively via bushings. This does not depart from the principles of the disclosure, and thus would fall within the scope of protection of the disclosure.

For example, in an alternative embodiment, a toe-in eccentric bolt is connected between the toe-in adjustment arm 35 and the subframe 1, the toe-in adjustment arm 35 may push and pull the steering knuckle 2 by adjusting the toe-in eccentric bolt to move the toe-in adjustment arm 35 close to or away from the subframe 1 so as to adjust the toe-in angle, and thus there is no limitation on the way of adjusting the toe-in adjustment arm 35 as long as the toe-in arm can be moved to push and pull the steering knuckle 2. This does not depart from the principles of the disclosure, and thus would fall within the scope of protection of the disclosure.

For example, in an alternative embodiment, the spring control arm 33 may also be provided with a spring arm threaded sleeve, the length of the spring control arm 33 is adjusted by adjusting the spring arm threaded sleeve, thereby displacing to push and pull the steering knuckle 2, resulting in a change in camber angle, so that there is no limitation on the way of adjusting the spring control arm 33 as long as the spring control arm 33 can push and pull the steering knuckle 2. This does not depart from the principles of the disclosure, and thus would fall within the scope of protection of the disclosure.

For example, in an alternative embodiment, the plane defined by the central axis of the front upper control arm 31 and the central axis of the rear upper control arm 32 is parallel to the XY plane, thereby facilitating the adjustment of the camber angle, but this is not restrictive, and the plane defined by the central axis of the front upper control arm 31 and the central axis of the rear upper control arm 32 may also not be parallel to the XY plane without affecting the layout of other structures. This does not depart from the principles of the disclosure, and thus would fall within the scope of protection of the disclosure.

For example, in an alternative embodiment, the Q point may be on the outer side of the wheel center or on the inner side of the wheel center, so that there is no limitation on the relative position of the Q point to the wheel center as long as the Q point has the same coordinate as the wheel center in the X direction of the vehicle. This does not depart from the principles of the disclosure, and thus would fall within the scope of protection of the disclosure.

Finally, it should be noted that although the disclosure is described with a five-link independent suspension 3 for a vehicle as an example, it is apparent that the five-link independent suspension 3 of the disclosure can be used in various types of vehicles, such as an electric vehicle, a fuel vehicle, a bus or a truck.

In addition, the disclosure further provides a vehicle. The vehicle is provided with a five-link independent suspension 3 for a vehicle in any one of the foregoing embodiments.

Heretofore, the technical solutions of the disclosure have been described with reference to the preferred embodiments shown in the accompanying drawings. However, those skilled in the art can readily understand that the scope of protection of the disclosure is apparently not limited to these specific embodiments. Those skilled in the art can make equivalent changes or substitutions to the related technical features without departing from the principle of the disclosure, and all the technical solutions with such changes or substitutions shall fall within the scope of protection of the disclosure.

What is claimed is:

1. A multi-link independent suspension for a vehicle that has a subframe and a steering knuckle, the multi-link independent suspension comprising:
   a front upper control arm, a rear upper control arm and a spring control arm, wherein:
   a first end of each of the front upper control arm, the rear upper control arm and the spring control arm is pivotally connected to the subframe and a second end of each of the front upper control arm, the rear upper control arm and the spring control arm is pivotally connected to the steering knuckle;
   the second end of the spring control arm is arranged below the steering knuckle, and the second end of the front upper control arm and the second end of the rear upper control arm are respectively arranged above the steering knuckle;
   the spring control arm is configured to move back and forth in the direction along a central axis of the spring control arm to drive the steering knuckle to rotate so as to adjust a camber angle of a wheel center;
   a central axis of the front upper control arm intersects with a central axis of the rear upper control arm at a Q point, and the Q point has a coordinate that is the same as a coordinate of the wheel center in an X direction of the vehicle;
   a rotation axis of the first end of the front upper control arm intersects with a rotation axis of the first end of the rear upper control arm at a P point;
   a connecting line between the P point and the Q point is defined as a motion centerline PQ between the front upper control arm and the rear upper control arm; and
   the motion centerline PQ coincides with a projection of the central axis of the spring control arm on an XY plane of the vehicle, so that when the spring control arm moves, the front upper control arm and the rear upper control arm remain stationary.

2. The multi-link independent suspension for a vehicle according to claim 1, further comprising a front lower control arm and a toe-in adjustment arm, wherein:
   a first end of each of the front lower control arm and the toe-in adjustment arm is pivotally connected to the subframe, and a second end of each of the front lower control arm and the toe-in adjustment arm is pivotally connected to the steering knuckle;
   the second end of the front lower control arm is arranged below the steering knuckle and located in front of the spring control arm; and the toe-in adjustment arm is configured to move the steering knuckle so as to adjust a toe-in angle of the wheel center.

3. The multi-link independent suspension for a vehicle according to claim 2, wherein a rotation axis of the first end of the spring control arm intersects with a rotation axis of the first end of the front lower control arm at an M point, and the central axis of the spring control arm intersects with a central axis of the front lower control arm at an N point;
 a connecting line between the M point and the N point is defined as a motion centerline MN of a control arm combination that includes the front upper control arm, the front lower control arm, the rear upper control arm and the spring control arm; and
 the motion centerline MN of the control arm combination that includes the front upper control arm, the front lower control arm, the rear upper control arm and the spring control arm is parallel to a central axis of the toe-in adjustment arm, and a rotation center of the second end of the toe-in adjustment arm has a coordinate that is the same as a coordinate of the wheel center in a Z direction of the vehicle.

4. The multi-link independent suspension for a vehicle according to claim 3, wherein an angle a between the rotation axis of the first end of the front upper control arm and the rotation axis of the first end of the rear upper control arm is approximately between 30° and 45°, an angle b between the rotation axis of the first end of the spring control arm and the rotation axis of the first end of the front lower control arm is approximately between 45° and 60°, and the sum of the angle a and the angle b is approximately 90°±10°.

5. The multi-link independent suspension for a vehicle according to claim 2, further comprising a stabilization rod which is fixed to the subframe and which is rotatable about a first axis, an end portion of the stabilization rod being pivotally connected to the steering knuckle.

6. The multi-link independent suspension for a vehicle according to claim 5, wherein the stabilization rod comprises a rear stabilization rod having two ends and one or more stabilization rod links, wherein the rear stabilization rod is fixed to a rear side of the subframe and the rear stabilization rod is rotatable about the first axis, each of the two ends of the rear stabilization rod respectively located on either side of the subframe and pivotally connected to one of the one or more stabilization rod links at one end of the connected stabilization rod link, an opposite end of the connected stabilization rod link pivotally connected to the steering knuckle, and connecting points of the second ends of the front upper control arm, the front lower control arm, the rear upper control arm, the spring control arm and the toe-in adjustment arm to the steering knuckle are all located on an inner side of a connecting point of the connected stabilization rod link to the steering knuckle, such that a distance from the wheel center to each of the connecting points is greater than the distance from the wheel center to the connecting point of the connected stabilization rod link to the steering knuckle.

7. The multi-link independent suspension for a vehicle according to claim 1, wherein a plane defined by the central axis of the front upper control arm and the central axis of the rear upper control arm is parallel to the XY plane.

8. The multi-link independent suspension for a vehicle according to claim 2, wherein the second end of the front lower control arm and the second end of the spring control arm are respectively located in front and back of a drive shaft.

9. The multi-link independent suspension for a vehicle according to claim 1, wherein an eccentric bolt is coupled between the spring control arm and the subframe.

10. A vehicle, comprising:
 a subframe;
 a steering knuckle; and
 a multi-link independent suspension, comprising a front upper control arm, a rear upper control arm and a spring control arm, wherein:
 a first end of each of the front upper control arm, the rear upper control arm and the spring control arm is pivotally connected to the subframe and a second end of each of the front upper control arm, the rear upper control arm and the spring control arm is pivotally connected to the steering knuckle;
 the second end of the spring control arm is arranged below the steering knuckle, and the second end of the front upper control arm and the second end of the rear upper control arm are respectively arranged above the steering knuckle;
 the spring control arm is configured to move back and forth in the direction along a central axis of the spring control arm to drive the steering knuckle to rotate so as to adjust a camber angle of a wheel center;
 a central axis of the front upper control arm intersects with a central axis of the rear upper control arm at a Q point, and the Q point has a coordinate that is the same as a coordinate of the wheel center in an X direction of the vehicle;
 a rotation axis of the first end of the front upper control arm intersects with a rotation axis of the first end of the rear upper control arm at a P point;
 a connecting line between the P point and the Q point is defined as a motion centerline PQ between the front upper control arm and the rear upper control arm; and
 the motion centerline PQ coincides with a projection of the central axis of the spring control arm on an XY plane of the vehicle, so that when the spring control arm moves, the front upper control arm and the rear upper control arm remain stationary.

* * * * *